(12) United States Patent
Trebouet et al.

(10) Patent No.: US 10,457,253 B2
(45) Date of Patent: Oct. 29, 2019

(54) DEVICE FOR CLEANING A SENSOR FOR A MOTOR VEHICLE

(71) Applicant: Valeo Systèmes d'Essuyage, Le Mesnil Saint Denis (FR)

(72) Inventors: Marcel Trebouet, Chavenay (FR); Giuseppe Grasso, Le Breuil sur Couze (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 315 days.

(21) Appl. No.: 15/214,639

(22) Filed: Jul. 20, 2016

(65) Prior Publication Data
US 2017/0021809 A1    Jan. 26, 2017

(30) Foreign Application Priority Data
Jul. 22, 2015   (FR) ..................... 15 56960

(51) Int. Cl.
| | |
|---|---|
| *B60S 1/52* | (2006.01) |
| *B60S 1/08* | (2006.01) |
| *B60S 1/56* | (2006.01) |
| *G02B 27/00* | (2006.01) |
| *B05B 1/32* | (2006.01) |
| *B08B 3/02* | (2006.01) |
| *B08B 5/02* | (2006.01) |

(52) U.S. Cl.
CPC ............ *B60S 1/52* (2013.01); *B05B 1/326* (2013.01); *B08B 3/02* (2013.01); *B08B 5/02* (2013.01); *B60S 1/0848* (2013.01); *B60S 1/528* (2013.01); *B60S 1/56* (2013.01); *G02B 27/0006* (2013.01)

(58) Field of Classification Search
None
See application file for complete search history.

(56) References Cited

U.S. PATENT DOCUMENTS

| | | |
|---|---|---|
| 2013/0048036 A1 | 2/2013 | Jonas |
| 2015/0138357 A1 | 5/2015 | Romack et al. |
| 2015/0151722 A1 | 6/2015 | Gokan et al. |

OTHER PUBLICATIONS

Preliminary Report and Written Opinion Issued in Corresponding French Application No. 1556960, dated May 24, 2016 (7 Pages).

*Primary Examiner* — Jason Y Ko
*Assistant Examiner* — Cristi J Tate-Sims
(74) *Attorney, Agent, or Firm* — Osha Liang LLP

(57) ABSTRACT

The present invention concerns a device for cleaning a sensor of a motor vehicle. The device in accordance with the invention includes means for simultaneous or sequential distribution via a distribution orifice (11) in a distribution nozzle (1) of a first fluid and/or a second fluid separately routed via a first admission channel (2) and/or via a second admission channel (3), respectively, to a common distribution chamber (10) in said distribution nozzle (1). It also includes means for moving said distribution nozzle (1) between a rest position and a deployed position, and these said means for moving the distribution nozzle (1) include means shared with the means for feeding the first admission channel (2) with the first fluid.

13 Claims, 3 Drawing Sheets

DEVICE FOR CLEANING A SENSOR FOR A MOTOR VEHICLE

Figure 1:
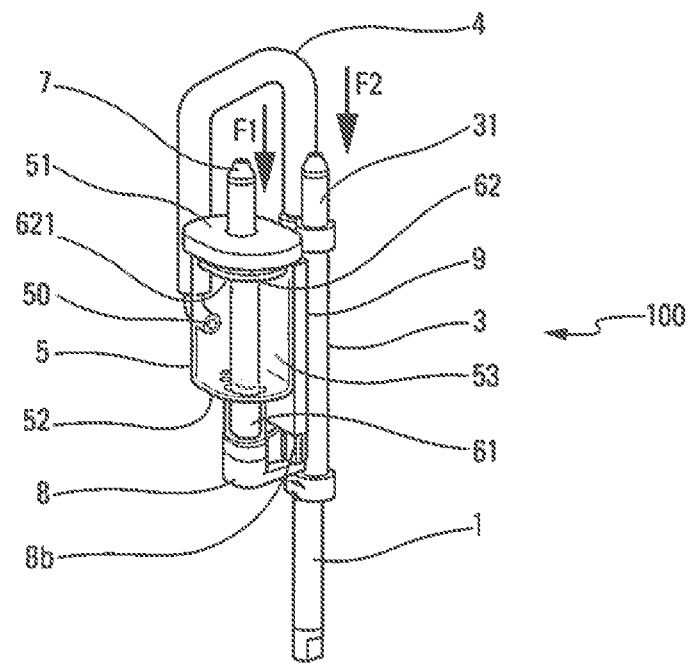

The present invention relates to the field of driver assistance devices and more particularly to the field of the sensors used for this purpose, such as imaging means, in particular video cameras, or detection means using electromagnetic waves, in particular radars or lidars. In this field, the invention is more particularly directed to the devices for cleaning such sensors.

Sensors equip an increasingly are number of motor vehicles in order to assist the driver of the vehicle in certain driving situations, one well known instance of which is to assist with parking. For this assistance to be as effective as possible, the images supplied by the imaging means, or the data transmitted by the radars, for example, must be of the best possible quality, and it is therefore essential for the faces of these sensors that face toward the outside of the vehicle to be clean. To this end, a device for cleaning the sensor may be associated with that sensor, and controlled to inject, onto said sensor, a flow of cleaning fluid just before detection is carried out. It is beneficial to control the device to determine the duration and the starting time of the cleaning sequence and to be able to retract the cleaning device after use, so that they do not interfere with detection when the sensors are operating, and so that they are protected from impacts, for example. Moreover, they must be as compact as possible to address the overall size constraints of the vehicle. Furthermore, there is the aim that such devices enable the injection of different fluids, gas or liquid. In fact, when a cleaning liquid is sprayed onto the sensor, for example the lens of an imaging video camera, to expel dirt from it, it is beneficial to dry this lens quickly in order to prevent any risk of pollution of the image by any traces that such a liquid might leave (spots, streaks, etc.).

The present invention has the aim of optimizing a cleaning device of this type, both in terms of its cleaning performance and in terms of its overall size.

To this end, the invention consists in a device for cleaning a sensor of a motor vehicle, which includes means for simultaneous or sequential distribution via a distribution orifice in a distribution nozzle of a first fluid and/or a second fluid separately routed to the distribution nozzle via a first admission channel and/or via a second admission channel, respectively. The device in accordance with the invention also includes means for moving the distribution nozzle between a rest position and a deployed position, notably in translation, notably along an axis parallel to the lengthwise direction of the first and second distribution channels. It is noteworthy in that these means for moving the distribution nozzle include means shared with the means for feeding the first admission channel with the first fluid.

In particular, these common means may include at least one piston rendered mobile by the pressure exerted by the first fluid and the associated piston rod of which has an end connected to the distribution nozzle.

In more detail, the means for feeding the first admission channel with the first fluid may include a feed chamber in which a piston is able to slide in a sealed manner, one end of a piston rod of which is, in accordance with the invention, fastened to a slider itself fastened to the distribution nozzle. As a result of this, any movement of the piston generates a movement of the slider, which in turn drives movement of the distribution nozzle.

The first and second admission channels may be constrained to move with the distribution nozzle so that the means for moving the nozzle drive movement of the assembly formed by the first admission channel, the second admission channel and the distribution nozzle.

In accordance with a series of features of the invention, considered separately or in combination, the first admission channel and the second admission channel may be parallel to each other and the distribution nozzle may extend in line with these first and second admission channels and in the same direction as them. The first admission channel and the second admission channel may also communicate with each other via a common distribution chamber to which they lead, notably at a first routing orifice and at a second routing orifice. The first admission channel and the second admission channel are advantageously provided, at their end via which the first and second fluids, respectively, are admitted into them, with a respective first non-return valve and a respective second non-return valve.

The device may include two distinct fluid inlets for feeding the first admission channel with the first fluid and for feeding the second admission channel with the second fluid, the inlet feeding the first admission channel with the first fluid being connected to the feed chamber.

In accordance with another feature of the invention, the means for feeding the first admission channel with the first fluid include a feed tip leading into the feed chamber and a flow orifice in a wall of said feed chamber through which the first fluid can flow into the first admission channel under certain conditions that will be described hereinafter, notably via a flexible feed canula. This flow orifice is advantageously positioned so that it leads alternately into a downstream volume of the feed chamber into which the first fluid is admitted via the feed tip or into an upstream volume of said feed chamber free of the first fluid as a function of the position of a plate of the piston during the sealed movement of said piston inside said feed chamber. In other words, in the travel of the piston inside the feed chamber, the latter delimits therein, by means of a plate that it includes, an upstream volume and a downstream volume. To be more precise, the downstream volume is the volume that receives the first fluid, admitted into the feed chamber via the feed tip, and the upstream volume is the complementary volume defined by the plate of the piston in the feed chamber. The respective dimensions of the upstream volume and the downstream volume therefore vary during the sealed movement of the piston inside the feed chamber as a function of the position of the plate of said piston, which leads to the flow orifice leading alternately into one or the other of these volumes as a function of the position of the plate of the piston inside the feed chamber.

In accordance with the invention, the strokes of the piston and of the slider fastened thereto and of the distribution nozzle are defined so that the distribution nozzle is in its deployed position when the flow orifice leads into the downstream volume of the feed chamber and so that the distribution nozzle is in its rest position when the flow orifice leads into the upstream volume of the feed chamber, Position return means, and in particular a spring place between the piston and the slider, are advantageously used to return the distribution nozzle into its rest position.

Figure 2:
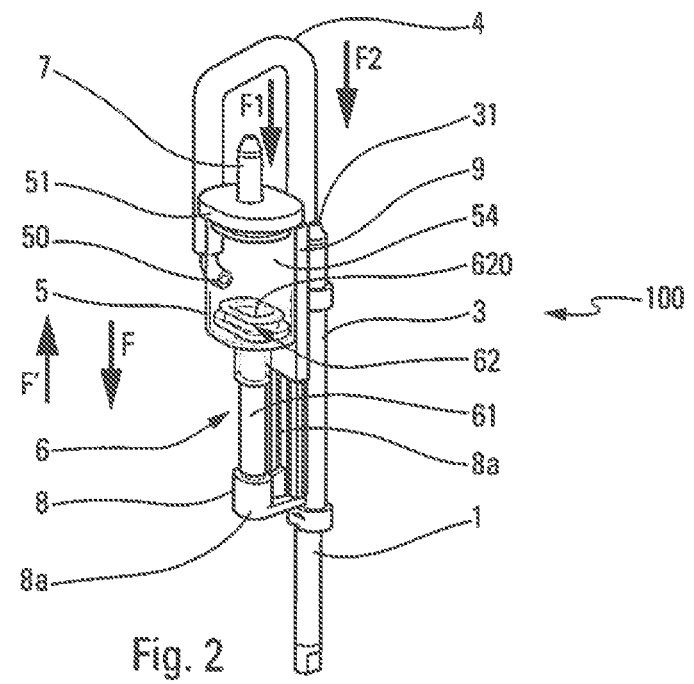
Figure 3:
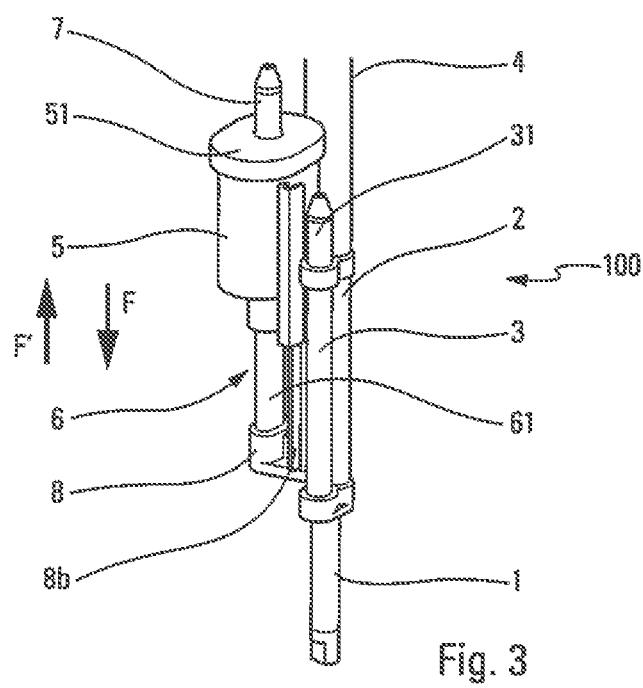
Figure 4:
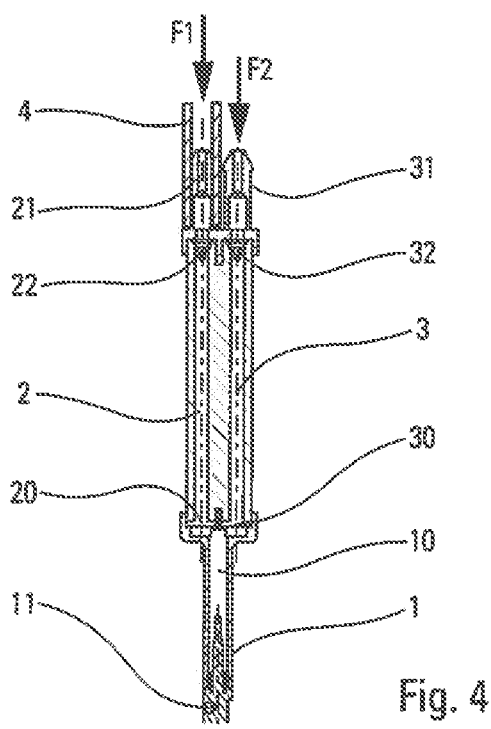
Figure 5:
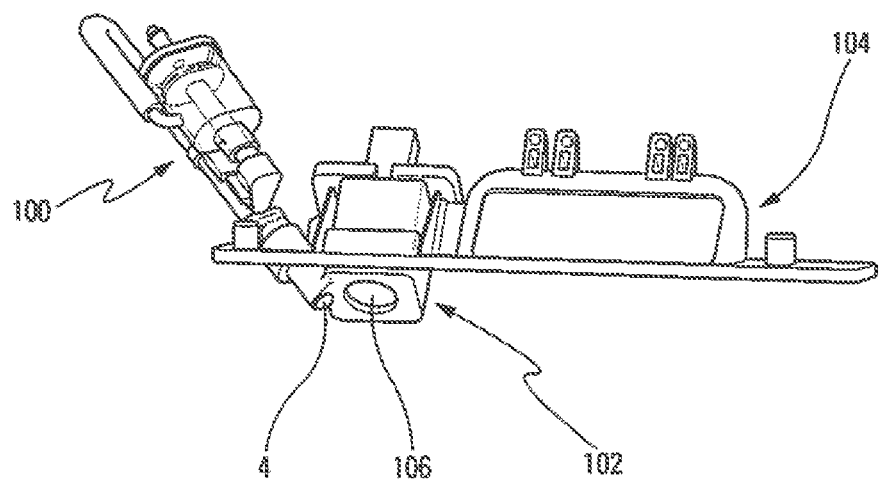
Figure 6:
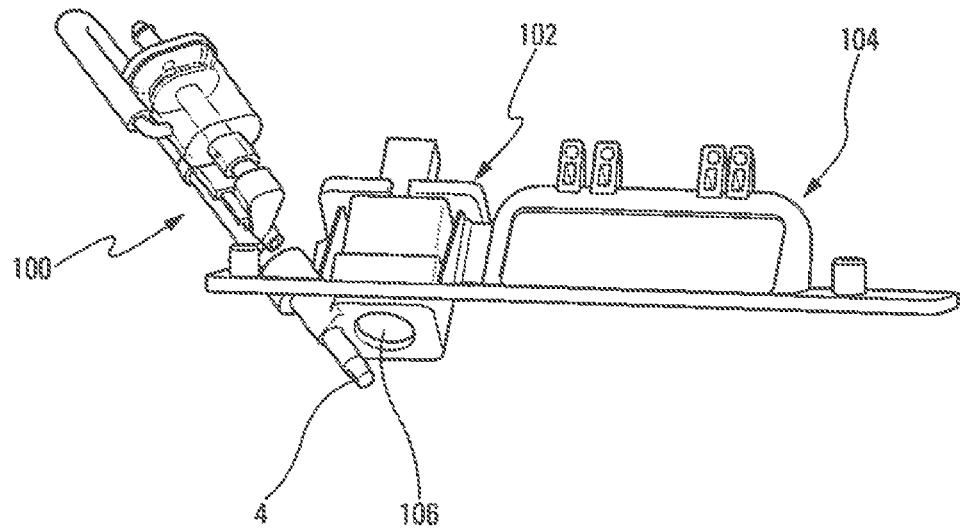

Other features, details and advantages of the invention as well as the operation of the device in accordance with the invention will emerge more clearly on reading the description given hereinafter by way of illustration and with reference to the drawings, in which:

FIG. 1 is a perspective general view of a device in accordance with the invention in a first position, FIG. 2 is a similar perspective view of the device from FIG. 1 in a second position;

FIG. 3 is a perspective view of the device in accordance with the invention in the second position shown in FIG. 2 as seen from a different angle, FIG. 4 is a diagrammatic sectional view of a part of the device in accordance with the invention, and FIGS. 5 and 6 are perspective views of a device in accordance with the invention and of the sensor to be cleaned in a rest position (FIG. 5) and a working position (FIG. 6).

It should first be noted that the figures show the invention in detail for the purposes of its reduction to practice, but that said figures may of course serve to define the invention more clearly if necessary.

In the following description, the terms "upstream" and "downstream" refer to the direction of flow of the fluids in the cleaning device in accordance with the invention and in the elements constituting it. Accordingly, the term "upstream" refers to the side of the device or of an element thereof on which the fluid or fluids is or are admitted, and the term "downstream" refers to the side of the device in accordance with the invention or an element thereof on which the fluid or fluids is or are distributed to the outside of the device in accordance with the invention or to another element thereof. It is to be noted that, as a function of the configuration of the various elements that constitute the device in accordance with the invention, the same element may be, at the same time, "downstream" or "upstream" of other elements of the device in accordance with the invention. It is also to be noted that, hereinafter, the generic term "fluid" interchangeably designates, without this modifying the nature and/or the scope of the invention, either a single fluid, gas or liquid, or a mixture of fluids, gas and/or liquid.

Referring to FIGS. 5 and 6, a cleaning device 100 is disposed in the vicinity of a sensor 102, fixed to a support 104 forming part of or mounted on a bodywork element of a motor vehicle. Here the cleaning device is arranged in an inclined disposition relative to the plane of the support, so that its free end, carrying an injection nozzle 4, when it is deployed (FIG. 6), faces toward the face 106 of the sensor to be cleaned, facing toward the outside of the vehicle, and that it is set back from this face 106 to be cleaned when it is retracted (FIG. 5).

Referring to FIGS. 1 to 4, a device in accordance with the invention includes a single distribution nozzle 1 that communicates on the upstream side with a first fluid admission channel 2 and a second fluid admission channel 3, which are advantageously parallel to each other. The first channel 2 and the second channel 3 are shown in more detail in FIG. 4. These two channels lead via two distinct routing orifices, respectively 20 for the first channel 2 and 30 for the second channel 3, into a common distribution chamber 10 inside the distribution nozzle 1. The distribution nozzle 1 is advantageously such that the common distribution chamber 10 communicates via a distribution channel that is not shown in the figures with a distribution orifice 11 that is shown diagrammatically in FIG. 4. It is also advantageous for the distribution nozzle 1 to be placed substantially in line with the first and second channels 2 and 3 in their common lengthwise direction. In accordance with the preferred embodiment of the invention shown in the figures, the first admission channel 2 and the second admission channel 3, each of which leads into the common distribution chamber 10, communicate freely with each other via the latter chamber. It follows that a fluid admitted into either of these admission channels can propagate freely into the other admission channel via the common distribution chamber 10.

In accordance with the invention, one of the admission channels (here the first admission channel 2 in accordance with the embodiment shown by the figures) is equipped at its upstream end with a first admission tip 21 through which it communicates with a specific fluid feed assembly that includes, in particular, a feed cannula 4, a feed chamber 5, a piston 6 and a feed tip 7. These various elements and their respective functions will now be described. A non-return valve 22, which can be seen in FIG. 4, is advantageously placed on the upstream side of the first admission channel 2, between the latter and the first admission tip 21.

In accordance with a preferred embodiment of the invention, the feed cannula 4 takes the form of a tube made from an advantageously flexible plastic material and its shape and its dimensions are advantageously defined to optimize the overall size of the device in accordance with the invention as a whole. At its downstream end, the feed cannula 4 is connected to the first admission channel 2, being received around the first admission tip 21, carried by the upstream end of the first admission channel 2. The feed cannula 4 therefore forms at its downstream end a sleeve around the first admission tip 21. The inside diameter of the feed cannula 4 is advantageously defined so that, once in place on the first admission tip 21, this feed cannula enables a fluid to be routed in the first admission channel 2 without that fluid leaking at the level of the junction between the first admission tip 21 and said feed cannula 4. At its upstream end, the feed cannula 4 communicates with the feed chamber 5 via a flow orifice 50 in a lateral wall of said feed chamber. The feed cannula 4 advantageously includes means (not shown in detail in the figures) such that, in its area of junction with the flow orifice 50, the fluid passes from the feed chamber 5 to the feed cannula 4 without the latter leaking.

The feed chamber 5 extends upstream and downstream of the flow orifice 50 and receives inside it the piston 6. In accordance with the invention, the piston 6 includes a piston rod 61 and a plate 62, the piston rod 61 being substantially centrally placed on the plate 62. The shape and the exterior dimensions of the plate 62 of the piston 6 are advantageously defined so that the latter can slide inside the feed chamber 5 with a snug fit. To be more precise, the plate 52 has a shape complementary to an interior section of the feed chamber in a plane substantially perpendicular to the direction of the piston rod 61 and the exterior dimensions of the plate 62 are very slightly less than the interior dimensions of the feed chamber 5 in said section plane. In other words, the piston 6 is able to slide in a sealed manner inside the feed chamber 5. In accordance with different embodiments of the invention, complementary sealing means (by way of nonlimiting example one or more seals) may be disposed at the periphery of the plate 62 of the piston 6. When it slides inside the feed chamber 5, the piston 6 moves in the direction of its piston rod 61 from a downstream end wall 51 to an upstream end wall 52 of that feed chamber 5. The shapes and the dimensions of the downstream end wall 51 and the upstream end wall 52 of the feed chamber 5 are advantageously similar to the shapes and dimensions of the plate 62 of the piston 6.

When the piston 6 moves inside the feed chamber 5 it defines inside the latter an upstream volume 53 and a downstream volume 54 that vary as a function of the position of the plate 62 of the piston 6 inside the feed chamber 5. To be more precise, the downstream volume 54 is delimited by the side wads of the feed chamber 5, a downstream face 620 of the plate 62 of the piston 6, and the downstream end wall 51 of the feed chamber 5, and the upstream volume 53 is delimited by the side walls of the feed chamber 5, the upstream face 621 opposite the downstream face 620 of the plate 62 of the piston 6, and the upstream end wall 52 of the feed chamber 5.

In accordance with the invention, the feed tip 7 is arranged on the feed chamber 5 so that, inside said feed chamber 5, it leads to a feed orifice 70 (not visible in the figures) situated on the downstream end wall 51 of the latter. Also in accordance with the invention, when the piston 6 slides inside the feed chamber 5, the flow orifice 50 leads alternately into the downstream volume 54 or into the upstream volume 53 of that feed chamber, depending on the position of the plate 62 of the piston 6 inside the latter.

In accordance with the invention, and as the figures show, the piston rod 61 of the piston 6 passes through the upstream end wall 52 of the feed chamber 5. Appropriate means are advantageously provided both on the piston rod of the piston 6 and on the upstream and wall 52 of the feed chamber 5 to seal this passage: by way of nonlimiting example, a set of O-rings and complementary grooves may be arranged on these two elements to enable the sealed sliding of the piston rod 61 of the piston 6 through the upstream end wall 52 of the feed chamber 5. Moreover, in accordance with the invention, the piston rod 61 of the piston 6 includes at its upstream end means for fastening it to a slider 8 that is fastened at least to the distribution nozzle 1, here an assembly formed by that distribution nozzle and the first admission channel 2 and the second admission channel 3. The slider 8 is therefore simultaneously fastened on the one hand to the two admission channels 2, 3 and therefore to the distribution nozzle 1 and on the other hand to the piston 6 sliding inside the feed chamber 5. It follows that any movement of the piston 6 inside the feed chamber 5 simultaneously causes, via the movement of the slider 8, movement of the two admission channels and the distribution nozzle 1. To this end, the slider 8 includes a portion 8a for fixing it to the end of the piston rod 61 and a slider 8b extending longitudinally in the direction n of movement of the distribution nozzle, this slider being mounted in a rail of corresponding shape (not visible in the figures) on a support plate 9 to which the feed chamber may be fastened. The slider is fastened to at least the distribution nozzle and here to the walls of the admission channels 2 and 3. The slider and the admission channels may notably produced as a one-piece assembly. As will be described in detail hereinafter, the movement of the piston caused by feeding the device with a first fluid via the passage in the feed chamber 5 causes the movement of the distribution nozzle 1 with the result that it may be said that the means for moving the distribution nozzle include means shared with the means for feeding the first admission channel with the first fluid.

The connection between the piston 6 and the slider 8 advantageously includes spring means for returning the piston into position, those means consisting for example in a return spring (not shown in the figures) placed between the downstream end wall 51 of the feed chamber 5 and the piston 6 so as to return the piston into the initial position in which the downstream volume is the smaller one, which corresponds to the rest position of the admission nozzle, retracted so as not to project from the device.

In accordance with the invention, the other admission channel (here the second admission channel 3 in the embodiment shown in the figures) is directly connected to a second fluid feed device, not shown in the figures, via a second admission tip 31. A non-return valve 32 (which can be seen in FIG. 4) is advantageously placed at the inlet of the second admission channel 3, on the upstream side of the latter, between it and the second admission tip 31. The non-return valves may in known manner be a ball valve, a gate valve, a flap valve or a double-flap valve, for example, or other known types of valves. It goes without saying that, just as the feed cannula 4 is advantageously made from a flexible material, the device for feeding the second admission channel 3 with fluid will advantageously be made, where it is connected to the second admission tip 31, from an equally flexible material so as, like the feed cannula 4 with the first admission channel 2, to be able to accompany any movement of the second admission channel 3 without causing fluid to leak.

A first mode of operation of the device in accordance with the invention as just described and shown in the figures is as follows.

In an initial position, shown more particularly by FIG. 1, the plate 62 of the piston 6 is substantially placed against the downstream end wall 51 of the feed chamber 5. In this position, the flow orifice 50 is in the upstream volume 63 of the feed chamber 5 defined above. When a first fluid is admitted into the feed chamber 5 via the feed tip 7 in the direction represented by the arrow F1 in the figures, the pressure exerted by this first fluid on the downstream face 620 of the plate 62 of the piston 6 causes the latter to move inside the feed chamber 5, towards its upstream end, in the direction represented by the arrow F in FIG. 2. In this movement, the downstream volume 54, defined by the stroke of the piston 6 in said feed chamber 5, increases until it includes the flow orifice 50, as FIG. 2 shows. The device in accordance with the invention is then in a second position in which the first fluid admitted into the downstream volume 54 of the feed chamber 5 is able to flow to the outside of the latter, in the feed cannula 4, via the flow orifice 50, thereby feeding the first admission channel 2 and thence the common distribution chamber 10 and the distribution orifice 11 of the distribution nozzle 1.

It is to be noted that the movement of the piston 6 induces, via the slider 8, a movement of the admission channels 2, 3 and of the distribution nozzle 1 in the same direction as that illustrated by the arrow F in FIG. 2, leading to said distribution nozzle 1 taking up a "deployed" position relative to its initial position shown by FIG. 1. The return spring placed between the piston 6 and the slider 8 is advantageously chosen and arranged so that it is compressed when the distribution nozzle 1 is in this deployed position.

A number of operating situations can then arise. In a first operating situation of the device in accordance with the invention, the admission of the first fluid via the feed tip 7 is continued and a second fluid is admitted, in the direction shown by the arrow F2 in the figures, into the second admission channel 3 so that the respective admission pressures of the first and second fluids are such that the second fluid mixes with the first fluid inside the common distribution chamber 10. The device in accordance with the invention then continuously delivers a mixture of the first and second fluids via the distribution orifice 11.

In a second operating situation, the admission of the first fluid via the feed tip 7 is stopped when a predefined amount of that first liquid has been admitted.

Because of the effect on the one hand of the return spring 9 and on the other hand of stopping feeding with the first fluid via the feed tip 7, the piston 6 is then returned to its initial position and is therefore caused to move toward the downstream end of the feed chamber 5 in the direction shown by the arrow F in FIG. 2. In this movement, the plate 62 of the piston 6 expels the first fluid contained in the downstream volume 54 that it defines in the feed chamber 5, via the flow orifice 50, to the feed cannula 4. This situation continues until, because of the movement of the plate 62 of the piston 6, the flow orifice 50 is located in the upstream volume 53 defined by the latter inside said feed chamber 5.

The flow of the first fluid in the feed cannula 4 is then stopped, the interior volume of the feed cannula 4 and that of the first admission channel 2 nevertheless remaining filled with the first fluid. A second fluid is then admitted in the direction shown by the arrow F2 in the figures into the second admission channel 3. In this operating situation, the admission pressure of the second fluid in the second admission channel 3 is nevertheless substantially greater than the pressure of the first fluid in the first admission channel 2. This results in an increased pressure of the second fluid relative to the first fluid. The first and second admission channels communicating with each other via the common distribution chamber 10, the second fluid rather than first fluid will therefore preferentially occupy the first admission channel 2, in which it will nevertheless remain confined thanks to the presence of a first non-return valve 21 placed on the upstream side of said first admission channel 2. To be more precise, initially, the second fluid will expel the first fluid present in the first admission channel 2, leading to an increase in the distribution pressure of the latter via the distribution orifice 11 of the distribution nozzle 1 and then, in a second time period, will extend into said first admission channel 2 and into the second admission channel 3 through which it is admitted into the device in accordance with the invention.

It is to be noted that in this operating situation a downstream residual volume (not shown in the figures) remains filled with the first fluid when the piston 6 is in a position such that the flow orifice 50 is located in the upstream volume 53 defined in this same feed chamber by the stroke of said piston, thereby stopping the flow of said first fluid in the feed cannula 4. In accordance with different embodiments, the flow orifice 50 could be placed so that this residual volume is a minimum volume (in this case, the flow orifice 50 will be as close as possible to the downstream end well 51 of the feed chamber 5) or could be placed so that said residual volume advantageously constitutes a "buffer" reserve of the first fluid. In all cases, the device for feeding the first fluid (not shown in the figures) will advantageously be equipped with non-return means in order to prevent any excess pressure of the first fluid inside the feed chamber 5 and the feed cannula 4 during admission of the second fluid at increased pressure.

If the second fluid is compressed air, for example, the device in accordance with the invention makes it possible, in this situation of operation, to dean the two admission channels between two sequences of distribution of the first fluid, thus preventing any fouling over time of those admission channels.

The device in accordance with the invention then makes it possible to perform sequentially the distribution of a predefined quantity of a first fluid and of a predefined quantity of a second fluid.

Regardless of the operating situation of the invention, in the first mode of operation that has been described it is feeding the feed chamber 5 with the first fluid that, because of the stroke of the piston 6 that it generates, causes the distribution nozzle 1 to move to a deployed position in which it is able to deliver the fluid or the mixture of fluids that its common distribution chamber 10 contains.

In an alternative second mode of operation, the movement of the distribution nozzle 1 into the deployed position may be governed by appropriate control means, for example as a function of particular driving situations. In this case, the movement of the distribution nozzle 1 into the deployed position generates by means of the slider 8 a movement of the piston 6 and of its plate 62 toward the upstream end of the feed chamber, which in turn causes a small drop in pressure inside the feed chamber 5, leading to the suction of a predefined amount of the first fluid, as a function of the stroke imparted to the piston 6 by the movement of the distribution nozzle 1. The operation of the device in accordance with the invention then occurs in a similar manner to the first mode of operation described above.

In all cases, the device in accordance with the invention therefore makes it possible, in various operating situations, either to distribute a fluid or a mixture of fluids for cleaning the sensors of a motor vehicle or to distribute in a predefined sequential manner alternately a first or a second fluid or a mixture of those two fluids.

The device in accordance with the invention therefore finds a particularly beneficial application in the field addressed by the invention since it makes it possible, in the same sequence of operations, to carry out both cleaning and drying of a sensor of a driving assistance system. A preferred application is for the first fluid to be the cleaning liquid, so that it exits via the distribution nozzle to clean a face of the sensor, for example a video camera lens, when the nozzle has been moved into the working position, facing the lens, by the action of that same cleaning liquid, and for the second fluid to be air, that it is injected into the device after the passage of the cleaning liquid in the injection nozzle to purge the residual liquid in the device and to prevent the possibly of icing up and/or to dry the cleaned lens.

The invention therefore advantageously encompasses a sensor cleaning device of this kind with the aim of assisting the driving of a motor vehicle, to the extent that the latter includes a cleaning device as just described and shown in the figures. It is nevertheless to be noted that the invention is not limited to the modes and configurations described and illustrated in the present document, but encompasses all equivalent modes and/or configurations and any technically operative combination of such modes and/or configurations. For example, a heating device may be provided on the upstream side of the cleaning device so that the fluids selectively routed and distributed are hot fluids to facilitate the subsequent drying of the cleaned face of the sensor and to prevent the formation of ice inside the cleaning device.

The invention claimed is:

1. A device for cleaning a sensor of a motor vehicle, comprising:
 means for simultaneous or sequential distribution via a distribution orifice in a distribution nozzle of a first fluid and/or a second fluid separately routed to said distribution nozzle via a first admission channel and/or via a second admission channel, respectively; and
 means for moving said distribution nozzle in a linear sliding motion between a rest position and a deployed position, wherein said means for moving the distribution nozzle include common means shared with the means for simultaneous or sequential distribution,
 wherein said common means include at least one piston rendered mobile by the pressure exerted by the first fluid and the associated piston rod of which has an end connected to the distribution nozzle, and
 wherein the first admission channel and the second admission channel are parallel to each other and wherein the distribution nozzle is in line with the first and second admission channels.

2. The device according to claim 1, further comprising means for feeding the first admission channel with the first fluid that include a feed chamber in which said piston is able to slide in a sealed manner with one end of said piston rod fastened to a slider itself fastened to at least the distribution nozzle so that any movement of the slider generated by movement of the piston drives movement of said distribution nozzle.

3. The device according to claim 1, wherein the first admission channel and the second admission channel are constrained to move with the distribution nozzle so that the means for moving the nozzle drive movement of the assembly formed by the first admission channel, the second admission channel and the distribution nozzle.

4. The device according to claim 1, further comprising two distinct fluid inlets for feeding the first admission channel with the first fluid and for feeding the second admission channel with the second fluid, the inlet feeding the first admission channel with the first fluid being connected to the feed chamber.

5. The device according to claim 4, wherein the means for feeding the first admission channel with the first fluid include a feed tip leading into the feed chamber and a flow orifice in a wall of said feed chamber through which the first fluid can flow into the first admission channel.

6. The device according to claim 5, wherein the flow orifice is positioned so that the orifice leads alternately into a downstream volume of the feed chamber into which the first fluid is admitted via the feed tip or into an upstream volume of said feed chamber free of the first fluid as a function of the position of a plate of the piston during the sealed movement of said piston inside said feed chamber.

7. The device according to claim 6, wherein the stroke of the piston and of the slider fastened thereto and of the distribution nozzle are defined so that the distribution nozzle is in the deployed position when the flow orifice leads into the downstream volume of the feed chamber and so that the distribution nozzle is in the rest position when the flow orifice leads into the upstream volume of the feed chamber.

8. The device according to claim 1, wherein the distribution nozzle is mobile in translation.

9. The device according to claim 8, wherein the distribution nozzle is mobile in translation along an axis parallel to the lengthwise direction of the first distribution channel and the second distribution channel.

10. The device according to claim 1, wherein the first admission channel and the second admission channel communicate with each other via a common distribution chamber to which they lead.

11. The device according to claim 1, wherein the first admission channel and the second admission channel are respectively provided at their end through which the first and second fluids respectively are admitted into them with a first non-return valve and a second non-return valve.

12. The device according to claim 1, further comprising position return means for the piston.

13. The device according to claim 1, wherein said distribution nozzle moves without rotation between the rest position and the deployed position.

* * * * *